Feb. 26, 1946. F. H. MAY ET AL 2,395,567
PROCESS OF MANUFACTURING POTASSIUM TETRABORATE
Filed Oct. 11, 1944
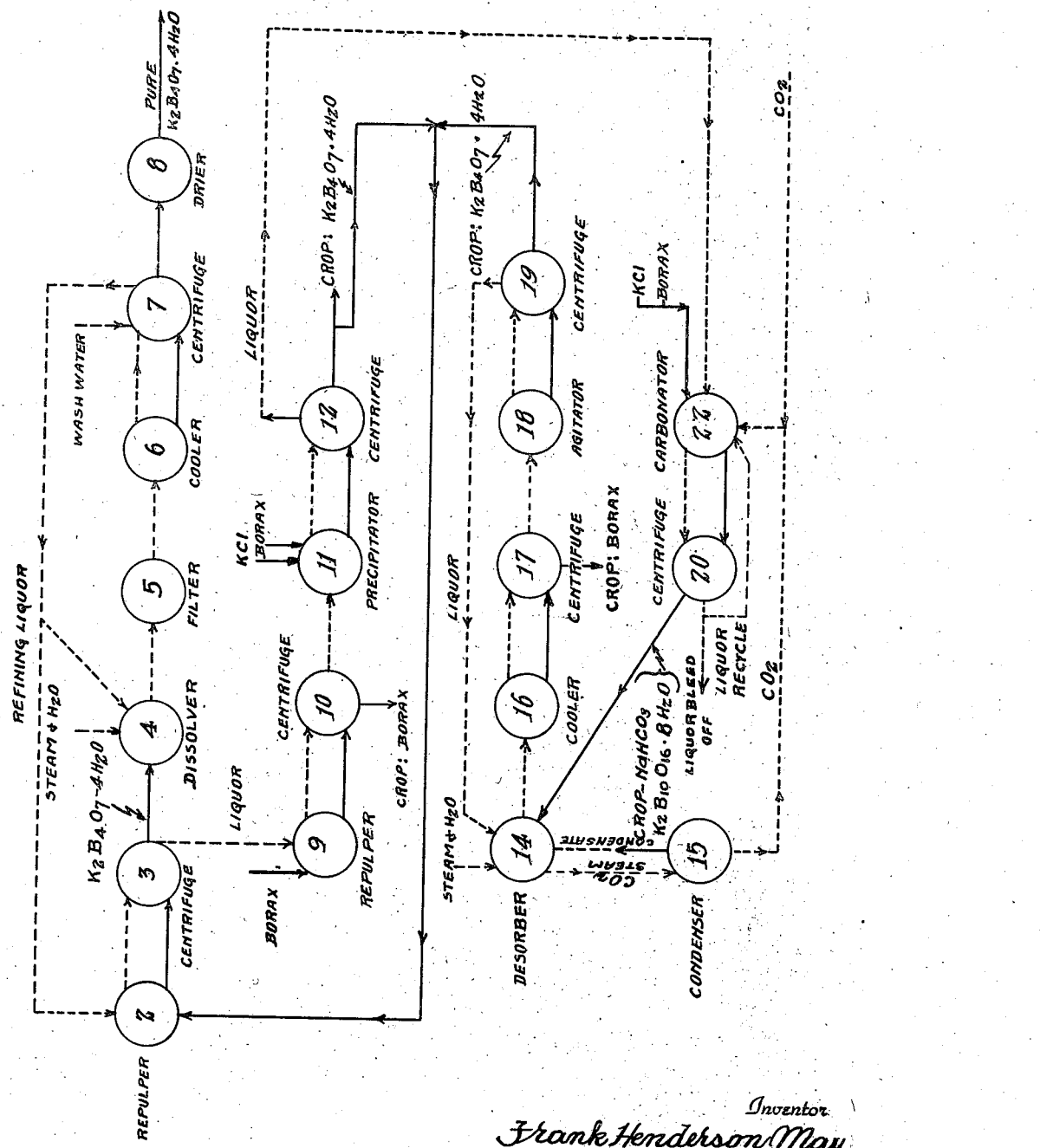
Inventor
Frank Henderson May
Henry B. Suhr
By
Attorneys Patented Feb. 26, 1946

2,395,567

UNITED STATES PATENT OFFICE 2,395,567

PROCESS OF MANUFACTURING POTASSIUM TETRABORATE

Frank Henderson May and Henry B. Suhr, Trona, Calif., assignors to American Potash & Chemical Corporation, Trona, Calif., a corporation of Delaware Application October 11, 1944, Serial No. 558,263

11 Claims. (Cl. 23—59)

This invention relates to a process for recovering potassium tetraborate, $K_2B_4O_7.4H_2O$, from solutions containing the same. The solutions may also contain sodium tetraborate (borax) and the process is of particular value in recovering potassium tetraborate from such solutions.

The two tetraborates possess quite similar "solubility curves" which makes the ordinary processes of separating said salts from saturated solutions based upon the fractional crystallization difficult to conduct and inefficient in their result. Considerable quantities of potassium tetraborate are dissolved in water at low temperatures and therefore render it inadvisable to discard liquors which are saturated with potassium tetraborate. In the past, in dealing with such liquors it has been necessary to recover the potassium tetraborate by evaporating such solutions in part at least before discarding the same.

According to the present invention substantially pure potassium tetraborate may be recovered from solutions containing said salts together with a variety of other salts which may be incidentally present by the addition of potassium chloride to the liquor. We have discovered that potassium chloride possesses unsuspected and advantageous properties in this respect—for instance by adding sufficient potassium chloride to a solution saturated with potassium tetraborate, and also saturated or near saturation with respect to sodium tetraborate—all of the potassium tetraborate may be caused to precipitate isothermally from the solution.

We have also discovered that the addition of potassium chloride to a solution saturated with potassium tetraborate and sodium tetraborate for bringing about a complete precipitation of the potassium tetraborate originally present, does not engender a precipitation of sodium tetraborate or borax from the solution. In fact we have discovered that if a solution saturated, for example, at 35° C. with respect to the two tetraborates, be treated with potassium chloride the resulting solution will become unsaturated with respect to sodium tetraborate and will dissolve further quantities of said sodium tetraborate. We therefore in our process may add these further quantities of sodium tetraborate as well as the potassium chlorides, and the addition of such further quantities of sodium tetraborate are effective in forcing potassium tetraborate out of the solution, enhancing the recovery of this valuable potassium salt.

By the addition of potassium chloride or potassium chloride and borax as described, to a solution saturated or nearly saturated with potassium and sodium tetraborates, all or even a greater amount of potassium tetraborate than was contained in the original liquor is precipitated, leaving a liquor which is relatively high in potassium chloride.

In order to provide a process of producing potassium tetraborate utilizing the discoveries of the present invention, which process shall profitably dispose of the aforesaid valuable end liquor, we have devised a cyclic process which constitutes the preferred form of our invention. This cyclic process is described in connection with the accompanying drawing.

The drawing represents a diagrammatic flow sheet of the preferred cyclic process embodying the present invention. In the drawing the numbered circles represent pieces of unit-process equipment. For example, 3 represents a suitable centrifugal machine with perforate basket whose function is the separation of suspended solids from a liquor; 5 represents a pressure filter, cloth covered, whose function is that of clarifying the hot solution, i. e., the removal of visible impurities, etc. Throughout the flow diagram, discrete solids are depicted as solid lines and fluids are depicted as broken lines. Hence the sludge passing to the centrifuge 3 is shown as a combination of the two, the recovered solid passing to 4 is shown as a solid line, the separated liquor passing to 9 as a broken line.

Referring to the drawing, we will begin the description of the cyclic process of the present invention at a point in the cycle where there is present a liquor substantially saturated at 35° C. with borax and potassium tetraborate. For example, such a liquor may contain about 145 pounds of $K_2B_4O_7.4H_2O$, 65 pounds of

$$Na_2B_4O_7.10H_2O$$

and 450 pounds of $H_2O$. Said liquor is passed into a precipitating vessel 11. In the vessel 11 sufficient potassium chloride is added to substantially saturate the liquor with potassium chloride and sufficient borax is added to retain the liquor substantially saturated during and at the conclusion of the step of precipitating the potassium tetraborate tetrahydrate. For this purpose in the examples given, 125 pounds of borax and 210 pounds of KCl were added to the liquor in the precipitator 11.

The addition of the potassium chloride causes the liquor to become supersaturated with respect to potassium tetraborate tetrahydrate but crystallization of this borate may lag and hence it may become necessary to either add small quantities of "seed" of $K_2B_4O_7.4H_2O$ to initiate the crystallization, or to agitate the solution for a considerable time, or both.

While we prefer to add sufficient potassium chloride to saturate the liquor, we have found that the recovery of potassium tetraborate tetrahydrate is fairly satisfactory even when lesser quantities are added. In some cases only potassium chloride may be added but in our preferred process we add borax also, as stated. The added borax cannot dissolve in the liquor at the start of the process since the liquor is already saturated with borax. However as the potassium chloride dissolves and the potassium tetraborate is precipitated in the process, the solution becomes unsaturated with respect to borax and the added quantity of that material can pass into solution.

The preferred manner of operating the process is to add the aforesaid 210 pounds of potassium chloride first and thereafter add the 125 pounds of borax. In order to complete the reaction both a reasonable length of time (for example 1 to 4 hours) and good agitation should be provided in the precipitator 11 to dissolve the constituents and complete the crystallization of the potassium tetraborate crop.

By this process there will be precipitated isothermally at 35° C. about 220 pounds of $$K_2B_4O_7.4H_2O$$

which is about 75 pounds more $K_2B_4O_7.4H_2O$ than was contained in the liquor passing to the precipitator 11. The precipitation of more potassium tetraborate tetrahydrate than was present in the original solution is undoubtedly due to a reaction taking place between the potassium chloride and borax added to said solution to form additional potassium tetraborate and a limited amount of sodium chloride. To our knowledge, this reaction has never been described in any literature and constitutes a valuable discovery and forms a valuable part of the present invention.

On completion of the precipitation of the $K_2B_4O_7.4H_2O$ in precipitator 11, the liquor and precipitate are then separated, preferably by means of the centrifuge 12. From the centrifuge 12 the $K_2B_4O_7.4H_2O$ may be withdrawn from the process and passed through a drier, if desired. In this manner there will be produced a finished product of fair purity. However, in the preferred cyclic process the crop of $K_2B_4O_7.4H_2O$ is combined with another crop of the same salt and the two passed together to a process of refining the $K_2B_4O_7.4H_2O$, to be hereinafter described. The liquor from the centrifuge 12, which liquor was originally saturated with respect to potassium tetraborate when it entered the precipitator 11, is now found to have substantially the following content: $Na_2B_4O_7.10H_2O$, 98 pounds; NaCl, 28 pounds; KCl, 173 pounds; and $H_2O$, 475 pounds, said $H_2O$ being in excess of that calculated as present with the borax.

The end liquor from the centrifuge 12 is then passed to a carbonation mechanism 22. In the carbonating mechanism 22 potassium chloride and borax are added and the mixture carbonated. To the carbonator 22 there is also added an end liquor which is produced as hereafter described and which is predominately sodium chloride. The potassium chloride may be added all at the start of the operation. Likewise the borax may be added all at the start of the operation if the carbonating mechanism is capable of handling very heavy sludges or suspensions. In other cases it may be desirable to add the borax during the carbonating procedure. In the carbonating mechanism 22 there is added about 1840 pounds of borax, 145 pounds of KCl and 265 pounds of carbon dioxide. The carbon dioxide, or over 99% thereof, is obtained from a subsequent decomposition step, as hereafter described, so that the carbon dioxide gas added may be considered simply as a circulating reagent.

In the carbonator 22 the following reaction occurs:

$$4KCl + 5Na_2B_4O_7.10H_2O + 6CO_2 = 2K_2B_{10}O_{16}.8H_2O + 6NaHCO_3 + 4NaCl + 31H_2O$$

From the foregoing reaction it will be seen that potassium pentaborate octohydrate, sodium bicarbonate and sodium chloride are all products of the reaction. In the process both potassium pentaborate octohydrate and sodium bicarbonate are crystallized and precipitated. The solution following the carbonating operation is essentially a solution of sodium chloride but contains minor quantities of potassium and borate salts. From the carbonating mechanism 22 the liquor and crystals are passed to a centrifuge 20 wherein the precipitated sodium bicarbonate and potassium pentaborate octohydrate are separated from the end liquor. Most of the end liquor is recycled to the carbonator 22, a small portion thereof being bled off, as indicated in the diagram.

The process performed in the carbonator 22 and centrifuge 20 is per se substantially the process described and claimed in copending application of Frank Henderson May, Serial No. 507,300, filed October 22, 1943, now Patent No. 2,374,877, granted May 1, 1945.

The mixed crystal crop of sodium bicarbonate and potassium pentaborate octohydrate is passed to the desorber 14. There is also added end liquor from a subsequent operation, to be hereafter described, and water and steam. The quantities of water and steam to be added are governed only by the sludge densities desired in subsequent crystallization. In the desorber the end liquor and crystal crop and added water are boiled to liberate carbon dioxide. This carbon dioxide is passed to a condenser 15 which removes the water from the carbon dioxide, the water being returned to the desorber 14, if desired. The carbon dioxide passes to the carbonating mechanism 22, as indicated.

In the desorber 14 the mixed crop of sodium bicarbonate and potassium pentaborate octohydrate go into solution and there is formed by the reaction occurring, sodium tetraborate or borax and potassium tetraborate. The hot liquor from the desorber 14 passes to a cooler or crystallizer 16 which serves to precipitate a crop of borax and simultaneously metastably supersaturates the solution with respect to potassium tetraborate tetrahydrate. The liquor and precipitate are passed to a centrifuge 17 wherein the borax is separated from the supersaturated solution. As pointed out hereafter, all or part of the borax so separated may be transferred to a subsequent step of the process. Metastably supersaturated solution is passed from the centrifuge 17 to an agitator 18 wherein the solution is agitated to induce crystallization of potassium tetraborate tetrahydrate. From the agitator 18 the crystals and liquor are transferred to the centrifuge 19 wherein the crystallized $K_2B_4O_7.4H_2O$ is separated from the liquor and the liquor recycled to the desorber 14. The portion of the process thus described taking place in the desorber 14, crystallizer 16, centrifuge 17, agitator 18, and centrifuge 19 is substantially the process described and claimed in copending application of Frank Henderson May, Serial No. 519,340, filed January 22, 1944, for the production of $$K_2B_4O_7.4H_2O$$

of fair (95%–98%) purity.

The two crops of $K_2B_4O_7.4H_2O$, one obtained from the centrifuge 19 and the other from the centrifuge 12, are passed to a refining process entering a re-pulper 2. In the example being described, 570 pounds of $K_2B_4O_7.4H_2O$ contained in the crop obtained from the centrifuge 19 together with the 220 pounds contained in the crop obtained from centrifuge 12, are passed to the re-pulper 2 where the two crops are mixed with a portion of a refining liquor. Sufficient liquor from the refining process is added to the re-pulper 2 to permit, after the steps hereafter described, the formation of the quantity of liquor previously described as being added to the precipitator 11.

This liquor is used in re-pulper 2 for the purpose of counter-washing the crop of $K_2B_4O_7.4H_2O$ to remove the impurities therefrom in order that the minimum impurities will be introduced into the refining cycle. From the re-pulper 2 the sludge produced therein is passed to the centrifuge 3 wherein the liquor and counter-washed solids are separated, the liquor is either passed directly from the centrifuge 3 to the precipitator 11, or, as indicated, to a re-pulper 9. In re-pulper 9 all or a part of the borax from the centrifuge 17 is introduced and commingles with the liquor after which the admixture of liquor and crystals is passed to the centrifuge 10. The purpose of introducing the borax crop from centrifuge 17 into the re-pulper 9 is two-fold, first to use the refinery liquor for the purpose of leaching from the borax crop any potash values which may have been included therein as an impurity, and, second, to introduce into the liquor sufficient borax to substantially saturate the liquor with borax before it enters the precipitator 11. Although the solution obtained from the refinery cycle or from centrifuge 3 may be saturated with potassium tetraborate, it contains low values of borax and by saturating the solution with borax, we find the liquor is capable of dissolving more potassium tetraborate and accordingly is capable of removing any potassium tetraborate which might have been precipitated in the borax crop obtained from centrifuge 17.

From the centrifuge 3 the counter-washed solids are passed into the dissolver 4 wherein the major portion of the refinery liquor is introduced and wherein also steam and water are introduced, the total quantity of water added being about 450 pounds to correspond to that being bled off from the cycle and passed to the precipitator 11. It is generally desirable to add to the dissolver 4 a quantity of mother liquor in order to control concentration of $K_2B_4O_7.4H_2O$ dissolved in the liquor in the dissolver 4 and also to control the subsequent density or thickness of the sludge precipitated in the following cooler 6. Generally, sufficient cycling mother liquor is added so that the liquor after being passed from the dissolver 4 through filter 5 to cooler 6 will produce a sludge in the cooler containing from 20 to 25% solids by weight in suspension. The filter 5 is for the purpose of removing such impurities as dirt, etc. which may have been introduced into the liquor. In the cooler 6 crystallization may be readily controlled, if desired, to yield large, clean-cut crystals of potassium tetraborate tetrahydrate. From the cooler 6 the crystals are passed to a centrifuge 7 wherein a certain amount of wash water may be introduced to free the crystals from the mother liquor, the liquor from the centrifuge being recycled either to dissolver 4 or re-pulper 2. From the centrifuge 7 the crop of pure $K_2B_4O_7.4H_2O$ crystals which, in the example of the process being described is about 645 pounds, is passed to the drier 8, and thence to market.

It will thus be seen that we have provided a complete cyclic process by means of which potassium chloride and borax are reacted together to yield potassium tetraborate tetrahydrate of extremely high purity, while at the same time obtaining a high efficiency in the conversion of the potash content of the potassium chloride used into potassium tetraborate tetrahydrate. There is also a high yield in the final product, $K_2B_4O_7.4H_2O$ of the tetraborate introduced as sodium tetraborate.

Essentially, it will be seen that the process comprises the first step of adding potassium chloride and borax to a solution substantially saturated with potassium tetraborate and sodium tetraborate so as to precipitate from said solution potassium tetraborate tetrahydrate only. The first step of this cyclic process results in a mother liquor high in potassium chloride and necessitates for its operation a source of liquor saturated with potassium tetraborate and preferably saturated with sodium tetraborate, which liquor should be low or appreciably free of chloride values. The recovery of the potash content in the liquor from the crystallization, and the production of the desired starting liquor saturated with potassium tetraborate is obtained in the remaining steps of the cycle, which include first reacting the liquor high in potassium chloride values with potassium chloride and borax, and carbonating the liquor so as to force out of the liquor the greater part of the valuable potash and borate content, yielding a mixed crop of sodium bicarbonate and potassium pentaborate octohydrate. The crystallization of this mixed crop separates the valuable potassium and borate values from the sodium chloride content formed by the reaction. This mixed crop is then subjected to the desorption operation, wherein the carbon dioxide used is recovered and wherein sodium bicarbonate and potassium pentaborate are reacted to form potassium tetraborate and sodium tetraborate, these two materials being separated from each other by crystallizing and removing the borax content while holding the solution metastably supersaturated with respect to the potassium tetraborate content. The potassium tetraborate content is then precipitated. The two sources of potassium tetraborate are then passed to a refining cycle and this refining cycle constitutes the source of production of the desired liquor substantially saturated with potassium tetraborate for the first step of the process of our invention.

The process of the present invention is of course capable of numerous modifications, all coming within the scope of the invention. One modification of our process may consist merely of the steps of taking a mixture of sodium bicarbonate and potassium pentaborate octohydrate (however derived), introducing such a mixture into a desorber, such as 14 in the drawing, driving off carbon dioxide, and forming a hot solution of sodium and potassium tetraborate. This hot solution may pass from the desorber 14 into a cooler such as 16, wherein in this alternative example of our process the hot solution is only cooled to the temperature at which borax precipitates without supersaturating the solution with potassium tetraborate, only saturating the solution in this case. The solution is then separated from the crystallized borax in centrifuge 17 and the solution then passed to a precipitator 11 in which potassium chloride or potassium chloride and borax are added in sufficient quantities to precipitate only potassium tetraborate tetrahydrate. The precipitated crop may then be separated in the centrifuge and the end liquor used in any desired manner.

Another modification of the process of our invention would be to pass all or part of the liquor obtained from centrifuge 19 to the precipitator 11. The liquor from centrifuge 19 is a liquor essentially saturated with potassium tetraborate and nearly saturated with borax, and may be used as a liquor or as part of the liquor to be employed in the process carried out in steps 11 and 12 by the addition of potassium chloride and borax in sufficient quantities to precipitate potassium tetraborate tetrahydrate only.

The end liquors from this potassium tetraborate precipitation may be employed in any suitable manner, for example, they may be sent to the carbonator 22 and to subsequent process steps substantially as shown on the flow sheet comprising the drawing of this application.

While the particular forms of the process herein described are well adapted to carry out the objects of the present invention, it is to be understood that numerous modifications may be made, and these processes are of the scope set forth in the appended claims.

We claim:

1. In a process for the manufacture of potassium tetraborate the steps of adding potassium chloride to a liquor essentially saturated with respect to potassium tetraborate tetrahydrate, precipitating potassium tetraborate tetrahydrate and removing it from the liquor.

2. In a process for the manufacture of potassium tetraborate the steps of adding potassium chloride to a liquor essentially saturated with respect to potassium tetraborate tetrahydrate and containing more than enough borax to saturate said solution therewith, reacting said ingredients, precipitating a crop of pure potassium tetraborate tetrahydrate, and removing it from the liquor.

3. In a process for the manufacture of potassium tetraborate the steps of adding potassium chloride to a liquor essentially saturated with respect to potassium tetraborate tetrahydrate and borax, precipitating potassium tetraborate tetrahydrate and removing it from the liquor.

4. In a process for the production of potassium tetraborate the steps which include reacting a mixture of potassium pentaborate and sodium bicarbonate to liberate carbon dioxide and to form a solution of sodium and potassium tetraborate, precipitating and separating a portion of the sodium tetraborate from the resulting liquor, adding potassium chloride to the liquor, precipitating potassium tetraborate tetrahydrate free of sodium tetraborate, and separating the pure potassium tetraborate.

5. The process as in claim 4, in which KCl-laden liquor is passed to a process for the production of potassium pentaborate and sodium bicarbonate by addition of potassium chloride, borax and carbon dioxide.

6. A process of manufacturing potassium tetraborate which comprises dissolving impure potassium tetraborate tetrahydrate in water and refinery end liquor, recrystallizing a pure crop of potassium tetraborate tetrahydrate while forming said refinery end liquor saturated with potassium tetraborate tetrahydrate, drawing off from the refinery cycle a portion of said end liquor and adding potassium chloride to said liquor to precipitate potassium tetraborate tetrahydrate therefrom, and removing it from the liquor.

7. A process of manufacturing potassium tetraborate which comprises dissolving impure potassium tetraborate tetrahydrate in water and refinery end liquor, recrystallizing a pure crop of potassium tetraborate tetrahydrate while forming said refinery end liquor saturated with potassium tetraborate tetrahydrate, drawing off from the refinery cycle a portion of said end liquor and adding potassium chloride and borax to said liquor to precipitate potassium tetraborate tetrahydrate therefrom, and removing it from the liquor.

8. A process of manufacturing potassium tetraborate which comprises adding potassium chloride to a liquor essentially saturated with respect to potassium tetraborate tetrahydrate and precipitating potassium tetraborate tetrahydrate from said liquor, removing the precipitate from the liquor, adding potassium chloride and borax to said liquor and carbonating the same to precipitate sodium bicarbonate and potassium pentaborate octohydrate, and separating the said crop from said liquor.

9. A cyclic process of reacting potassium chloride and borax to produce potassium tetraborate tetrahydrate, which process comprises adding to a liquor essentially saturated with potassium tetraborate tetrahydrate, potassium chloride and borax so as to precipitate potassium tetraborate tetrahydrate from said liquor, separating this precipitate from the liquor, adding further potassium chloride and borax to said liquor and carbonating the liquor to precipitate sodium bicarbonate and potassium pentaborate octohydrate therefrom, dissolving and decomposing said mixed crop to form potassium tetraborate, separately crystallizing said tetraborate, passing the two crops of potassium tetraborate tetrahydrate to a refinery cycle wherein said tetraborate is redissolved and reprecipitated, and bleeding-off a portion of the refinery cycle liquor to the first operation.

10. A process of forming potassium tetraborate tetrahydrate which comprises reacting sodium bicarbonate and potassium pentaborate octohydrate and water to liberate carbon dioxide and form sodium tetraborate and potassium tetraborate in solution, cooling the solution to crystallize sodium tetraborate only, and to form a solution essentially saturated with potassium tetraborate tetrahydrate, adding potassium chloride and borax to said solution to precipitate potassium tetraborate tetrahydrate only, and separating the potassium tetraborate tetrahydrate from the liquor.

11. A process of manufacturing potassium tetraborate tetrahydrate which comprises reacting sodium bicarbonate and potassium pentaborate octohydrate and water to liberate carbon dioxide and form sodium and potassium tetraborate in solution, cooling such solution to precipitate borax, and thereafter precipitating potassium tetraborate from said solution, leaving a liquor essentially saturated with respect to potassium tetraborate tetrahydrate, thereafter adding potassium chloride to said liquor to further precipitate potassium tetraborate, and separating the same from said liquor.

FRANK HENDERSON MAY.
HENRY B. SUHR.